US008032937B2

(12) United States Patent
Ellis (10) Patent No.: US 8,032,937 B2
(45) Date of Patent: Oct. 4, 2011

(54) METHOD, APPARATUS, AND COMPUTER PROGRAM PRODUCT FOR DETECTING COMPUTER WORMS IN A NETWORK

(75) Inventor: Daniel R. Ellis, Ashburn, VA (US)

(73) Assignee: The Mitre Corporation, McLean, VA (US)

(*) Notice: Subject to any disclaimer, the term of this patent is extended or adjusted under 35 U.S.C. 154(b) by 888 days.

(21) Appl. No.: 10/972,787

(22) Filed: Oct. 26, 2004

(65) Prior Publication Data
US 2010/0199349 A1 Aug. 5, 2010

(51) Int. Cl.
*G06F 11/00* (2006.01)
(52) U.S. Cl. .......... 726/24; 726/22; 726/23; 726/25; 713/150; 713/151; 713/152; 713/153; 713/154; 713/155; 713/156; 713/157; 713/158; 713/159
(58) Field of Classification Search .......... 726/22–25; 713/150–158
See application file for complete search history.

(56) References Cited

U.S. PATENT DOCUMENTS

| | | | |
|---|---|---|---|
| 7,203,963 B1* | 4/2007 | Wu et al. ................. 726/23 |
| 2003/0065926 A1 | 4/2003 | Schultz et al. |
| 2003/0110396 A1* | 6/2003 | Lewis et al. .............. 713/201 |
| 2003/0167402 A1 | 9/2003 | Stolfo et al. |
| 2004/0015719 A1* | 1/2004 | Lee et al. ................. 713/201 |
| 2004/0205474 A1 | 10/2004 | Eskin et al. |
| 2005/0021740 A1* | 1/2005 | Bar et al. ................. 709/224 |
| 2005/0050378 A1* | 3/2005 | Liang ...................... 714/4 |
| 2005/0257264 A1 | 11/2005 | Stolfo et al. |
| 2005/0265331 A1 | 12/2005 | Stolfo |
| 2005/0281291 A1 | 12/2005 | Stolfo et al. |
| 2006/0075492 A1* | 4/2006 | Golan et al. ............. 726/22 |

OTHER PUBLICATIONS

U.S. Appl. No. 10/972,785, Ellis, Daniel R.
Kim, H. et al., "Autograph: Toward Automated, Distributed Worm Signature Detection", Proceedings of the 13th Usenix Security Symposium (Security 2004), San Diego, CA, Aug. 2004.
Weaver, N. et al., "Very Fast Containment of Scanning Worms", Proceedings of the 13th Usenix Security Conference, 2004.
Cheung, S. et al, "The Design of GrIDS: A Graph-Based Intrusion Detection System", UCD Technical Report CSE-99-2, Jan. 1999.
Staniford-Chen, S. et al, "GrIDS: A Graph-Based Intrusion Detection System for Large Networks", Proceedings of the 19th National Information Systems Security Conference, Baltimore, 1996.
Singh, S. et al., "The EarlyBird System for Real-time Detection of Unknown Worms", UCSD Tech Report CS2003-0761, Aug. 2003.
Staniford, S., "Containment of Scanning Worms in Enterprise Networks", Oct. 7, 2003.
Ellis, D., "Worm Anatomy and Model", Proceedings of ACM CCS WORM Wokshop 2003, Oct. 2003.

(Continued)

*Primary Examiner* — Edan Orgad
*Assistant Examiner* — Roderick Tolentino
(74) *Attorney, Agent, or Firm* — Sterne, Kessler, Goldstein & Fox P.L.L.C.

(57) ABSTRACT

A worm is a malicious process that autonomously spreads itself from one host to another. To infect a host, a worm must somehow copy itself to the host. The method in which a worm transmits a copy of itself produces network traffic patterns that can be generalized as a traffic behavior. As a worm spreads itself across the network, the propagation of the traffic behavior can be witnessed as hosts are infected, one after another. By monitoring the network traffic for propagations of traffic behaviors, a presence of a worm can be detected.

55 Claims, 8 Drawing Sheets

OTHER PUBLICATIONS

Chen, S. et al., "Slowing Down Internet Worms", In Proc. of 24th International Conference on Distributed Computing Systems (ICDCS'04), Tokyo, Japan, Mar. 2004.

Cheetancheri, S.G., "Modelling a Computer Worm Defense System", Thesis submitted in partial satisfaction of the requirements for the degree of Master of Science in Computer Science in the Office of University of California Davis, 2004.

Zou, C.C. et al., "A Firewall Network System for Worm Defense in Enterprise Networks," University of Massachusetts, Technical Report TR-04-CSE-01, Feb. 4, 2004.

Hung, J.C. et al., "A Behavior-based Anti-Worm System", in proceedings of the IEEE 17th International Conference on Advanced Information Networking and Applications (AINA2003), Xi'an, China, Mar. 27- 29, 2003.

Welcher, P.J. et al., "Network Detection of Worms and Viruses", Enterprise Networks & Servers, [online]. Dec. 2003, [retrieved on Apr. 1, 2005]. Retrieved from the Internet: <URL: http://www.enterprisenetworksandservers.com/monthly/art.php/408>.

Singh, S. et al., "Automated Worm Fingerprinting", Department of Computer Science and Engineering, University of California, San Diego, 2003.

Schechter, S. et al., "Fast Detection of Scanning Worm Infections", Seventh International Symposium on Recent Advances in Intrusion Detection (RAID) Sophia Antipolis, French Riviera, France. Sep. 15-17, 2004.

"Cisco Self-Defending Network", [online]. Cisco Systems, Inc., [retrieved Mar. 5, 2005]. Retrieved from the Internet: <URL: http://www.cisco.com/en/US/netsol/ns340/ns394/ns171/ns413/networking_solutions_package.html>.

International Search Report for International Application No. PCT/US05/37381 mailed Jun. 24, 2008.

Notification Concerning Transmittal of International Preliminary Report on Patentability; Written Opinion of the International Searching Authority, 7 pages, Date of Mailing, Jan. 29, 2009.

* cited by examiner

METHOD, APPARATUS, AND COMPUTER PROGRAM PRODUCT FOR DETECTING COMPUTER WORMS IN A NETWORK

CROSS REFERENCE TO RELATED APPLICATIONS

This application is related to commonly owned, co-pending U.S. application Ser. No. 10/972,785, filed Oct. 26, 2004, entitled "System and method to emulate mobile logic in a communication system," which is incorporated herein by reference.

BACKGROUND OF THE INVENTION

1. Field of the Invention

The present invention relates to detecting computer worms in a computer network.

2. Background Art

A computer in a network is vulnerable to malicious activities in the network. One such threat is the computer worm. A worm is a process that spreads from one host to another across the network by stealthily copying and running itself on unsuspecting hosts. As the worm spreads and infects more and more hosts, the rate at which the worm can infect other hosts in the aggregate grows at an increasing, often exponential, rate.

A worm runs a copy of itself on an unsuspecting host by exploiting some vulnerability on the host. Since a worm is a computer process, it has the potential to execute malicious code on the host. For example, a worm may delete files or use the processing power of the host to make denial of service attacks on another host. Furthermore, as a worm copies itself to more and more hosts, the network traffic generated by the worm may cause major network congestion. The activities of a worm may impair a host and the network.

Since it is difficult to identify all the vulnerabilities of a host and to predict the new methods in which worms will exploit those vulnerabilities, automatic detection of new worms is particularly challenging.

Today, new worms are detected manually, often after the affects and damage of the new worm are well felt. Once a new worm is discovered, a particular characteristic of the worm is identified and this characteristic is used to detect the future presence of the known worm in the network. Hence, contemporary systems are generally limited to detecting worms that are known a priori.

What is needed is a method and system of detecting new worms automatically so that they may be detected and contained quickly before the worm spreads too far. Automatic detection and response is becoming an imperative because a newly released worm can infect millions of hosts in a matter of seconds.

BRIEF SUMMARY OF THE INVENTION

The present invention is a method, apparatus, and a computer program product for automatically detecting the presence of a worm in a computer network.

In order for a worm to infect another host, the worm must communicate with that host. Hence traffic is generated as a worm infects or attempts to infect another host. A particular feature of the traffic that is generated is described as a traffic behavior.

The traffic in the computer network is monitored to identify the occurrences of traffic behaviors. Examples of traffic behaviors are the transmission of any IP packet, the presence of a half-open TCP connection, and a sequence of packets which match a predetermined pattern.

As worms propagate and infect new hosts, the traffic behavior exhibited by the worm's activity will also appear to propagate across the network.

To determine if one or more traffic behaviors are propagating across the network, the identified traffic behavior occurrences are organized into a data structure representing a tree. The nodes of the tree represent hosts which exhibited the traffic behavior and the links of the tree represent the occurrence of a traffic behavior. Some worms are capable of exploiting multiple vulnerabilities and therefore may exhibit multiple traffic behaviors as they spread across the network. Hence, the links in the tree may not all represent the same traffic behavior. The data structure may not explicitly need to maintain both node and link information. If all the links represent the same traffic behavior, the data structure may simply maintain information for each node and its depth in the tree.

Once the data structure representing the tree is formed, the characteristics of the tree are examined to detect a possible presence of a worm. Some of the characteristics checked are the depth, the number of nodes, the average branching factor for each depth of the tree, the average branching factor for the internal nodes of the tree, and the average propagation time to the first descendant at each depth of the tree. For example, if the branching factor of the internal nodes is greater than a small threshold (e.g., four) and the average propagation time is much less than a second, then there is a strong indication that the traffic behaviors were actually caused by a worm rather than by some other non-malicious activity.

Furthermore, subsets of the tree may be inspected to identify worm-like symptoms. In a tree formed by multiple traffic behaviors, the presence of alpha-in alpha-out and server-to-client worm-like symptoms may provide additional indications that a worm is present. Once a host in the tree has been identified as a possible worm infected host, other hosts in the tree that have exhibited the same traffic behavior as the one exhibited by the possible worm-infected host may also be identified as potential worm-infected hosts.

In addition, hosts may be marked to indicate that a host should not be exhibiting a particular set of traffic behaviors to further facilitate the detection of a worm.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Although the embodiments of the invention described herein refer specifically, and by way of example, to worms, it will be readily apparent to persons skilled in the relevant art(s) that the invention is equally applicable to other mobile logic, including but not limited to viruses, E-mail viruses, or any other logic that is capable of propagating itself or a process associated with the mobile logic in a communication system.

Components of an Example Network

Figure 1:
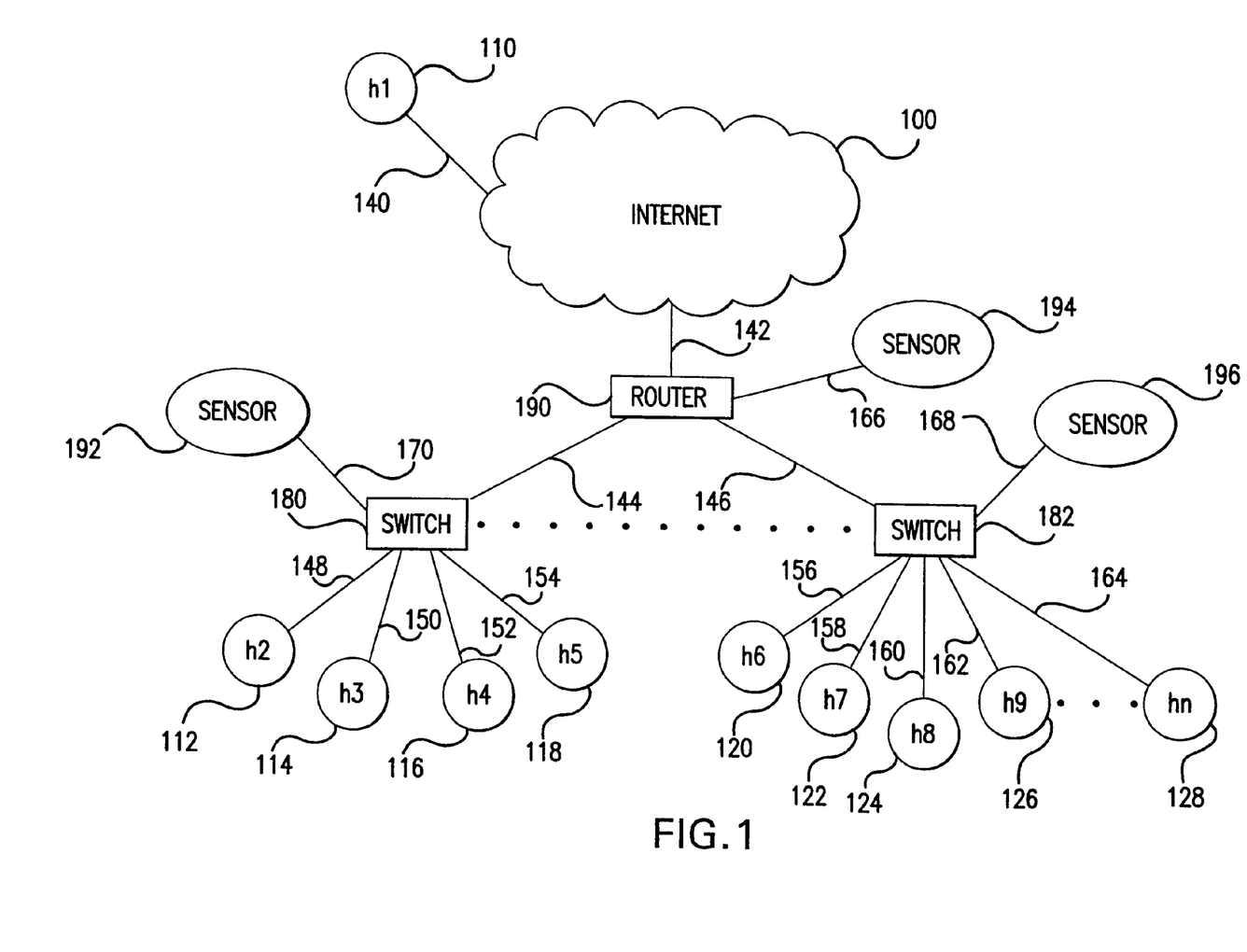
FIG. 1 illustrates an example of a computer network.

FIG. 1 illustrates an example of a computer network consisting of the Internet 100, router 190, switches 180 and 182, sensors 192-196, hosts 110-128, and network connections 140-170. The computer network in FIG. 1 represents a packet-based network utilizing, for example, TCP/IP packets according to the open systems interconnection (OSI) seven-layer protocol suite of the International Standards Organization (ISO). The network connections 140-170 may be, for example, Ethernet connections representing OSI layers 1 and 2. Hosts communicate with each other by transmitting internet protocol (IP) packets through the network. For example, when host 110 wants to communicate with host 126, host 110 transmits a packet through network connections 140, 142, 146, and 162, the Internet 100, router 190, and switch 182. Anywhere along this path, the traffic between host 110 and 126 may be monitored.

Each of sensors 192-196 represents a physical implementation of an embodiment of the present invention as a standalone device that is placed in the network. However, the present invention may be installed to run on any network device or computer that is capable of monitoring network traffic such as a router, a switch, or a host.

In FIG. 1, sensor 192 is configured to see all the packets that pass through switch 180, sensor 196 is configured to see all the packets that pass through switch 182, and sensor 194 is configured to see all the packets that pass through router 190. The sensors 192-196 may communicate with each other to share network traffic information.

Characteristics of a Worm

A worm typically exploits some vulnerability on a remote host to transmit a copy of itself to the remote host. This activity produces traffic in the network. Distinguishing features of this traffic are described as traffic behaviors.

For example, worms often exploit a buffer overflow vulnerability of a network service on a target host. To exploit a buffer overflow, a worm on the infected host acts as a client and initiates a TCP connection with a network service on the target host. The worm client then transmits a carefully engineered data packet to exploit the buffer overflow vulnerability of the network service and infects the target host. Once the target host has been infected, the worm client attempts to tear down the TCP connection. However, the target host is typically unable to properly shutdown its side of the TCP connection, since it is difficult to recover a socket after a buffer overflow. Hence, when a worm client exploits a buffer overflow vulnerability, a half-open TCP connection will commonly remain. The formation of a half-open TCP connection, in this example, can be described as a traffic behavior that is exhibited when this worm infects a host.

A traffic behavior describes any feature of the traffic that is exhibited when a worm on one host infects or attempts to infect another host. The simplest traffic behavior is the presence of a single packet that is transmitted from one host to another. Another traffic behavior may be the transmission of a UDP packet to a specific port. A more complicated traffic behavior may be the presence of a half-open TCP connection.

A traffic behavior may not be unique to worm traffic and may also be exhibited by normal traffic. For example, a half-open TCP connection may arise for reasons other than a buffer overflow exploitation. Hence, the mere presence of a single traffic behavior may not indicate the presence of a worm. However, if a particular traffic behavior is witnessed to propagate across the network in a manner resembling the propagation of a worm, it is more likely that the traffic behaviors were caused by worm traffic rather than normal traffic.

The propagation of a worm can be graphed into (i.e., represented as) a tree (i.e., a tree-like data structure). The internal nodes of the tree represent infected hosts, and the leaf nodes represent either infected hosts or hosts that the worm has unsuccessfully attempted to infect. A worm may have been unsuccessful for various reasons. For example, the worm may have targeted a host that does not exist. This condition can occur if the worm is attempting to infect hosts by randomly generating IP addresses. Another possible reason for an unsuccessful infection is that the worm may have targeted a host which is not vulnerable to its attack. A link in the tree from a parent node to a child node indicates that the parent node infected or attempted to infect the child node. In organizing the propagation of a worm into a tree, links representing re-infections are omitted to prevent cycles from forming in the graph.

Figure 2:
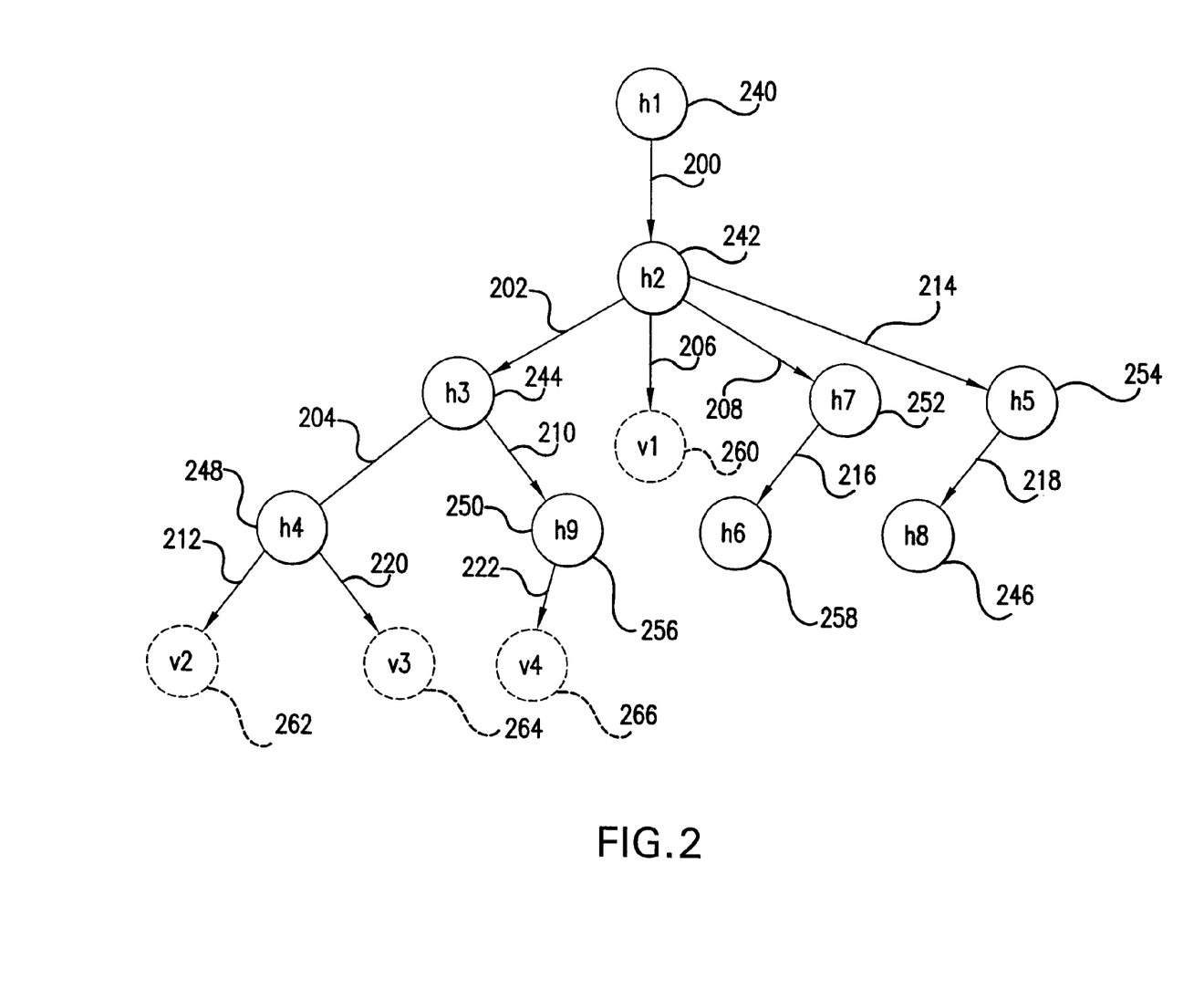
FIG. 2 illustrates the propagation of a worm through the exemplary network illustrated in FIG. 1.

For example, FIG. 2 illustrates the propagation of a worm through the exemplary network illustrated in FIG. 1. Host 240 is initially infected and infects host 242. The arrows 200-222 indicate the direction the worm has propagated, for example at OSI layer 3. Hosts 240-258 are actual hosts which have been infected. Hosts 260-266 are either actual hosts which the worm could not infect or hosts that do not exist but were targeted by the worm.

By organizing the occurrences of infections into a tree structure as described above, certain propagation characteristics of a worm are revealed. For example, since each infected host typically attempts to infect other hosts, the branching factor of a worm is generally greater than one and the number of descendents typically grow exponentially from one depth of the tree to the next. Furthermore, for a worm which is very aggressive, the depth of the tree may grow at a very fast rate.

Detecting the Presence of a Worm

The present invention uses the knowledge that worms produce traffic behaviors as it infects new hosts and that worms exhibit certain propagation characteristics to detect the presence of a new worm.

A worm may use one or more techniques to exploit a vulnerability. In addition a worm may exploit different vulnerabilities. For each combination of technique and vulnerability exploited, a different traffic behavior may arise. However, since a worm typically knows only a few techniques and vulnerabilities, the set of traffic behaviors is finite for each worm.

Figure 3:
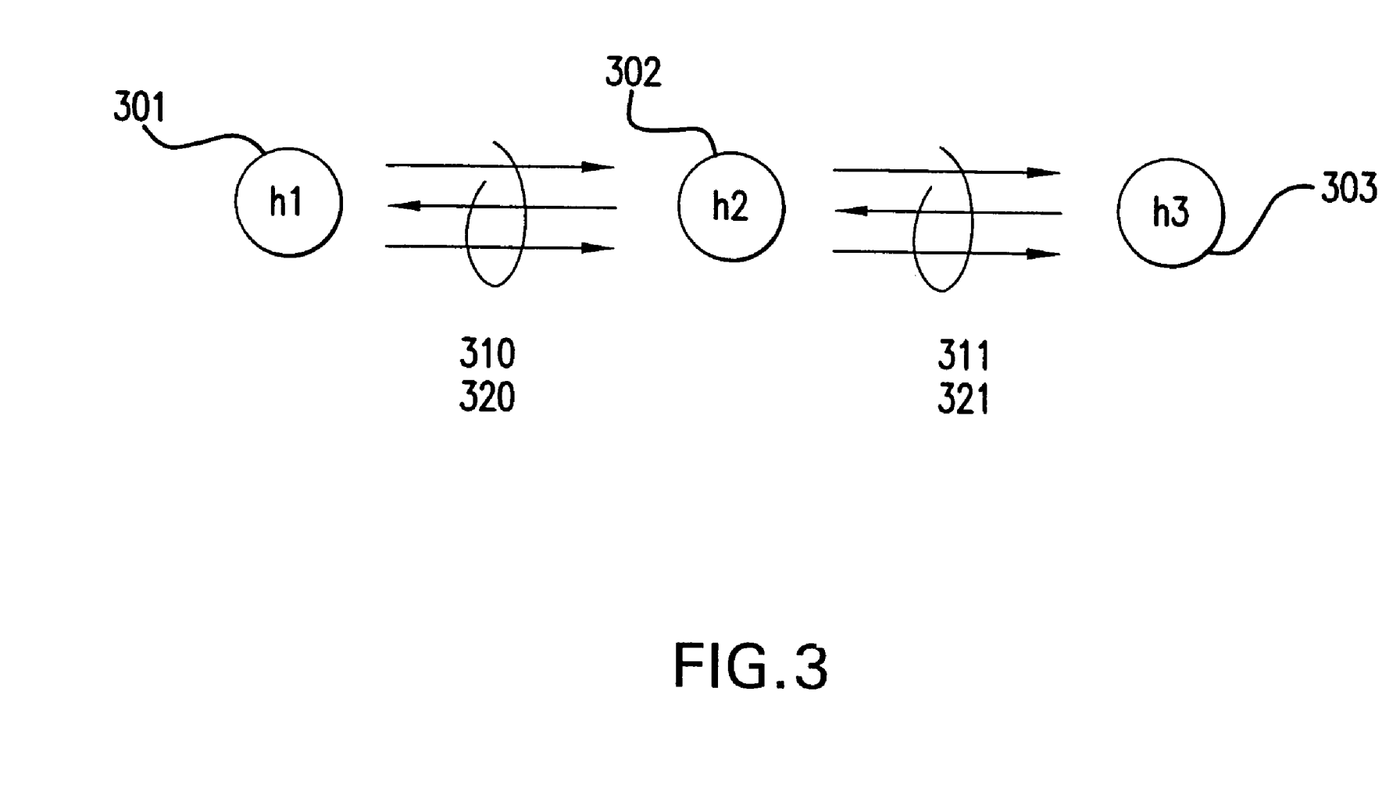
FIG. 3 illustrates the occurrence of traffic behaviors as a worm propagates from host to host.

FIG. 3 illustrates the occurrence of traffic behaviors as a worm propagates from host to host. Host 301 is infected with a worm. The worm on host 301 initiates traffic 310 with host 302. The traffic 310 contains a mechanism to exploit a vulnerability in host 302 and infects it. Once host 302 is infected, host 302 initiates traffic 311 with host 303. The traffic 311 contains the same or another mechanism to exploit the same or another vulnerability in host 303. A distinguishing feature of traffic 310 is described as traffic behavior 320. A distinguishing feature of traffic 311 is described as traffic behavior 321.

The presence of a traffic behavior may provide hints to identify a possible worm-infected host. Many worms typically exploit only a single vulnerability and therefore produce the same traffic behavior whenever they infect a new host. Hence, if a host was a target of one traffic behavior and the host starts targeting other hosts with the same traffic behavior, then it is possible that the host was infected by a worm. This worm-like symptom, called alpha-in alpha-out, is illustrated in FIG. 3 when traffic behavior 320 and 321 are the same. When traffic behavior 320 and 321 are the same, there is a strong indication that a worm has spread from host 301 to host 302 and from host 302 to host 303.

Furthermore, many worms seek out new hosts by actively making client connections to potential new targets. These targets are servers. When a server is attacked and infected, the worm on the newly infected target host attempts to infect other hosts. As a result, the infected target host begins to act like a client. Hence, when a host initially acts as a server for a traffic behavior and then subsequently acts as a client for the same traffic behavior, the presence of these traffic behaviors may indicate that the host has been infected by a worm. This worm-like symptom is called server-to-client, and it is illustrated in FIG. 3 when traffic behaviors 320 and 321 are the same and describe a client connection on a particular port. As an example, suppose traffic behavior 320 and 321 describe a client to server connection on port 80. Host 302 acted as a server for the traffic behavior 320 and acted as a client for traffic behavior 321. Host 302 is said to exhibit a server-to-client worm-like symptom.

As discussed above, detecting traffic behaviors arriving and leaving a single host may reveal the presence of a worm. However, when traffic behaviors are witnessed to propagate across the network in a worm-like fashion, there is a stronger indication that a worm may be infecting the hosts.

Occurrences of traffic behaviors, which have been identified, can be organized into tree graphs to reveal the propagation of a particular traffic behavior or a set of traffic behaviors in the network. For each traffic behavior occurrence that has been detected, a source host and a destination host are identified. The source host is a host which initiated the traffic behavior. The destination host is the target of the traffic behavior. If the tree is empty, a node representing the source host is added as the root of the tree. If the source host is present in the tree and the destination host is not, then the destination host is added as a child node to the source host in the tree. If the source host is not in the tree, then the destination host is not added to the tree because there is no indication that the traffic behavior propagated from a host already present in the tree. If the destination host is already in the tree, it is not added to the tree again. If the traffic behavior or traffic behaviors that were being graphed into a tree actually represented worm traffic, the presence of the destination host in the tree would indicate a reinfection.

Once the occurrences of the traffic behavior are organized into a tree, the characteristics of the tree are examined to determine if the traffic behaviors propagated through the hosts in a manner that is similar to worm-like propagation. If the propagation is characteristic of worm-like propagation, the present invention indicates that the hosts may have been infected by a worm.

In determining if the tree exhibits worm-like propagation, several different comparisons or tests can be performed on the tree.

If the depth of the tree is greater than some threshold value, the traffic behavior has propagated to some threshold depth and therefore may indicate that the hosts are infected by a worm.

If the number of nodes in the tree is greater than some threshold, the traffic behavior has propagated to some threshold number of hosts and therefore may indicate that the hosts are infected by a worm.

The average branching factor of each depth of the tree is defined as $\Sigma(D_{i+1}/D_i)/FD$ where the summation occurs over the range $1 \leq i \leq (FD-1)$, $D_i$ is the number of descendants at depth i of the tree, and FD is the depth of the tree where FD is greater than one. If the average branching factor of each depth of the tree is greater than about one, the tree is growing exponentially and therefore may indicate that the hosts are infected by a worm.

The average branching factor of the internal nodes of the tree is defined as $\Sigma(D(x))/N$ for all x, where $D(x)$ is number of child nodes of an internal node x and N is the number of internal nodes. If the average branching factor of the internal nodes of the tree is greater than about one, the tree is growing exponentially and therefore may indicate that the hosts are infected by a worm.

If the average propagation time of the tree from one generation to the next is defined as $(time(FD_n)-time(FD_1))/(n)$ where $time(FD_i)$ is the time the first descendant is added to the tree at depth i, and if the average propagation time is less than some threshold, the tree is growing faster than some threshold and therefore may indicate that the hosts are infected by a worm.

Figure 4:
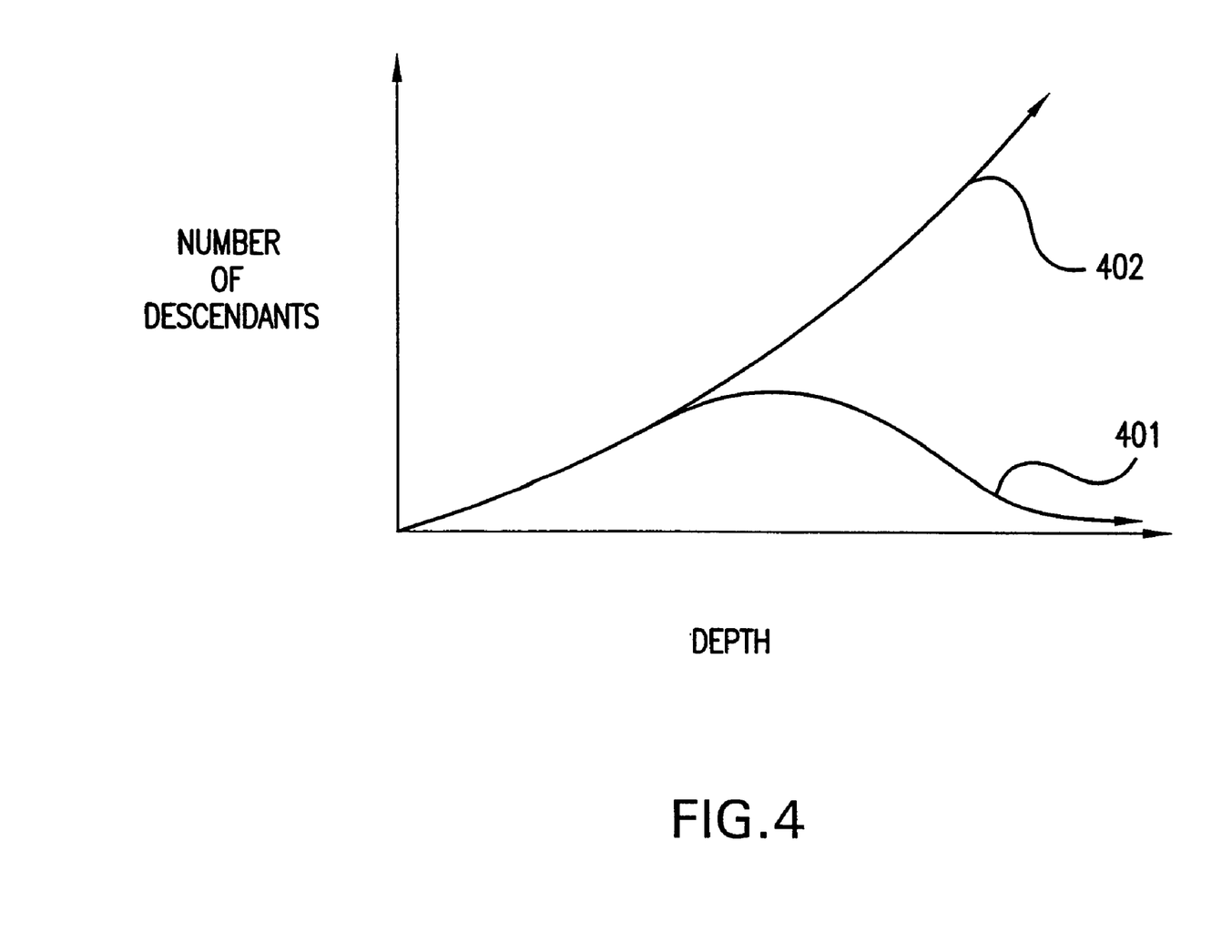
FIG. 4 illustrates a comparison between worm traffic and normal traffic in regards to the number of descendants each traffic accumulates per depth.
Figure 5:
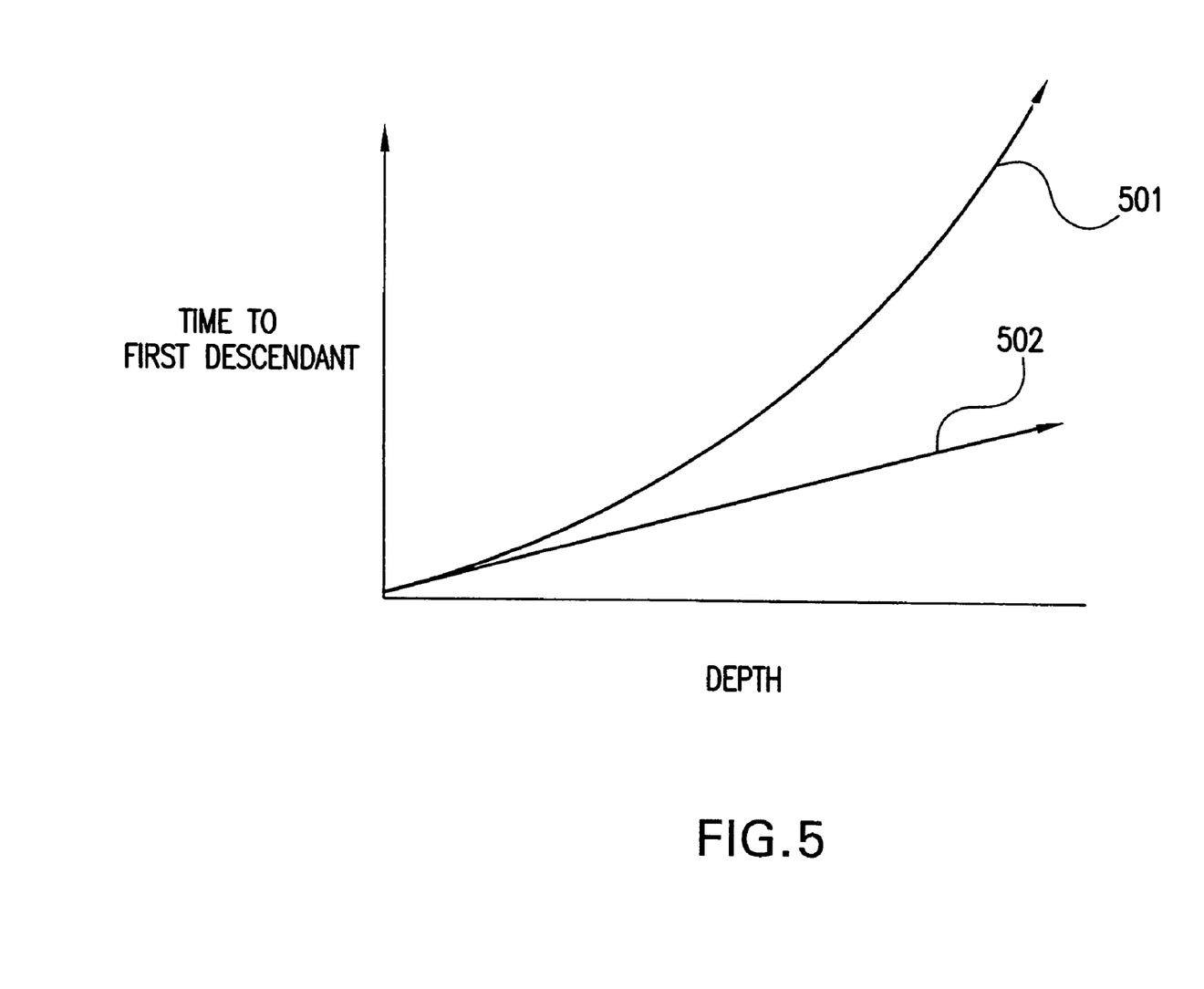
FIG. 5 illustrates a comparison between worm traffic and normal traffic in regards to the amount of time each traffic takes to propagate to a particular depth.

Examining the propagation of a traffic behavior is a powerful mechanism to detect worms. For example, FIG. 4 and FIG. 5 illustrate a comparison between worm traffic and normal traffic for a particular traffic behavior. The traffic behavior detected in both figures is a transmission of any IP packet from one host to another. The occurrences of this traffic behavior was detected in the network for normal traffic and organized into a tree as described above. Likewise the occurrences of this traffic behavior was also detected for worm traffic and organized into a separate tree.

In FIG. 4, the number of descendants at each depth of the tree is graphed for both normal traffic 401 and worm traffic 402. The number of descendants for normal traffic 401 typically increases up to some depth and then decreases over time. However, for worm traffic 402, the number of descendants increases steadily to indicate that the worm is growing exponentially.

In FIG. 5, the amount of time to reach the first node in each depth of the tree is graphed for both normal traffic 501 and worm traffic 502. For normal traffic, the number of descendants eventually decrease as depth increases. Therefore, the amount of time normal traffic 501 takes to reach greater depths of the tree typically grows exponentially. However, worm traffic 502 typically spreads quickly and during the early phase of propagation, the time it takes for the worm to infect another host is small and close to constant. Therefore, during the early stages of worm propagation, the worm reaches new depths at nearly a constant and fast rate. The linear slope of the worm traffic 502 indicates that an automated process is controlling the pace of its growth.

FIG. 4 and FIG. 5 illustrate that simply examining the relationship of how IP packets propagate through the network is an effective means to determine if there is a worm present in the network.

However, a traffic behavior which is more distinctive than simply indicating that an IP packet has been transmitted is more likely to produce a stronger indication that one or more hosts are infected by a worm.

Furthermore, to additionally facilitate the detection of a worm in a computer network, a host may be marked to indicate that the host should not exhibit a particular set of traffic behaviors (for example, based on some policy). As occurrences of traffic behaviors are detected, if a host is identified as exhibiting a prohibited traffic behavior, the host may be identified as a possible worm-infected host. In a tree graph representing the propagation of a traffic behavior, the presence of hosts which should not be exhibiting the traffic behavior may provide a stronger indication that the hosts in the tree graph may have been infected by a worm.

For example, a host may be marked to indicate that the host should not exhibit any traffic behaviors that would involve the host as a server. Likewise, a host may be marked to indicate that the host should not exhibit any traffic behaviors that would involve the host as a client. Marking hosts in this manner facilitates determining the likelihood that hosts in a computer network have been infected by a worm.

If different types of traffic behaviors are graphed into a single tree to detect the propagation of a worm, the presence of alpha-in alpha-out and server-to-client worm like symptoms in the tree may provide additional indications that a worm is present. When a possible worm-infected host has been identified in the tree, there is a strong likelihood that other hosts in the tree exhibiting the same traffic behavior are also worm-infected hosts.

Once a host has been identified as a possible worm-infected host, the host may be quarantined. For example, the host may be isolated so that it may not transmit or receive all or particular types of IP packets. The host may also be placed in a separate virtual LAN (VLAN) partition.

In a configuration where portions of a network are subdivided by different sensors where smaller sensors monitor only a region and a larger sensor monitors multiple regions, if the smaller sensor identifies a host as a possible worm-infected host, the host may be escalated to the larger sensor for further observation. Since the larger server is capable of monitoring more traffic, it may be able to observe the propagation of traffic behaviors in greater detail.

Different Traffic Behaviors

A traffic behavior describes any feature of the traffic that is generated when a worm on one host infects or attempts to infect another. An occurrence of a traffic behavior can be identified by monitoring the network traffic and comparing a sequence of packets with a predetermined pattern.

The following are examples of predetermined patterns that can be used to match a sequence of packets to detect the occurrence of traffic behaviors generally exhibited by worms. $P_{name}$ indicates a pattern and a and b represent hosts.

$P_{base\ case}$=a sends any IP packet to b $P_{echo}$=a sends an ICMP echo request to b $P_{half\text{-}open\ TCP\ connection}$=
   a sends a TCP SYN packet to some port on b
   b replies with a SYN ACK packet to a
   a sends TCP FIN to packet to b
   b never sends back a TCP RST or TCP FIN packet to a $P_{fanout}$=
   a sends any IP packet to b
   Either:
     b replies with a TCP RST packet to a
     an ICMP host b unreachable message is returned to a
     no response from b is seen before a timeout occurs $P_{attack\ and\ download\ from\ third\ party}$=
   a sends any IP packet to b
   b sends a packet to a fixed, well-known host c
   c sends a packet to b The following are examples of predetermined patterns that can be used to match a sequence of packets to detect the occurrence of traffic behaviors generally exhibited by some historical worms. $P_{name}$ indicates a pattern and a, b, and c represent hosts.

$P_{LionWorm}$=
   a establishes and tears down a TCP connection with port 80 on b
   a establishes another TCP connection with b and over the connection:
     a sends at least one packet to b
     b does not close its side of the connection
   b contacts c
   c sends Lion Worm source code to b in the payload of at least one packet $P_{Slammer}$=
   a sends a UDP packet to port 1434 on b $P_{Blaster}$=
   a connects to TCP port 135 on b
   b does not close its side of the connection
   b sends a UDP packet to port 69 on a
   a replies with UDP packet to b $P_{Welchia}$=
   a sends an echo request to b
   b sends an echo reply to a
   a connects to TCP port 135 on b
   b sends a UDP packet to a port between 666 and 765 on a
   a replies with UDP packet to b $P_{Sasser}$=
   a establishes a TCP connection with port 445 on b
   b does not close its side of the connection
   a establishes a TCP connection with port 9996 on b
   b establishes a connection with port 5554 on a Examples of Embodiments The method of the present invention can be embedded into any network device that is capable of monitoring network traffic such as a router, a switch, or a proxy server. In addition, the method of the present invention may be combined with a general purpose computer containing a network interface to form a standalone network appliance. Furthermore, the method of the present invention may run on any computer host that is connected to the network.

Figure 6:
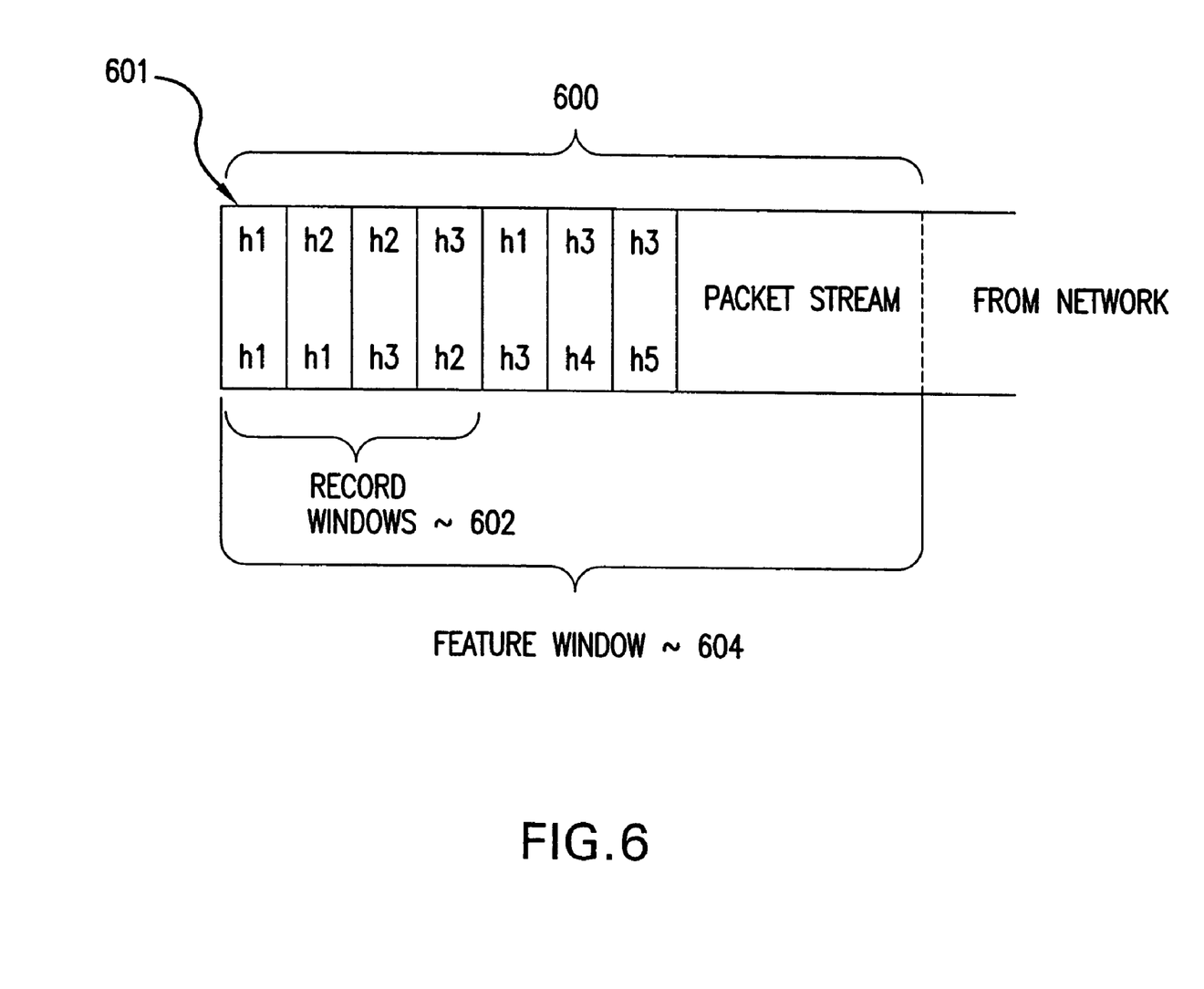
FIG. 6 illustrates one technique of monitoring network traffic.

FIG. 6 illustrates one technique an embodiment of the present invention may utilize to monitor network traffic. Packet traces 600 are obtained from the network traffic, for example, by utilizing a packet sniffer such as tcpdump. A packet trace is a record of a packet and may include among other things the source and destination, hosts of a packet. For example, packet trace 601 includes source host identifier h1 and destination host identifier h2. For a period of time, the packets in the network are collected as packet traces and grouped into a feature window 604. A subset of the packet traces within the feature window are selected as packet traces of a record window 602. For each host in a packet trace of the record window 602, a tree-like data structure (wherein the host is the root of the tree) is created for each traffic behavior that is monitored. Next, the packet traces in the feature window 604 are checked sequentially to detect an occurrence of a monitored traffic behavior. If an occurrence of a traffic behavior is detected, all tree-like data structures associated with the traffic behavior are updated to determine if there is a propagation of the traffic behavior across the network that is similar to the manner in which worms propagate.

Figure 7:
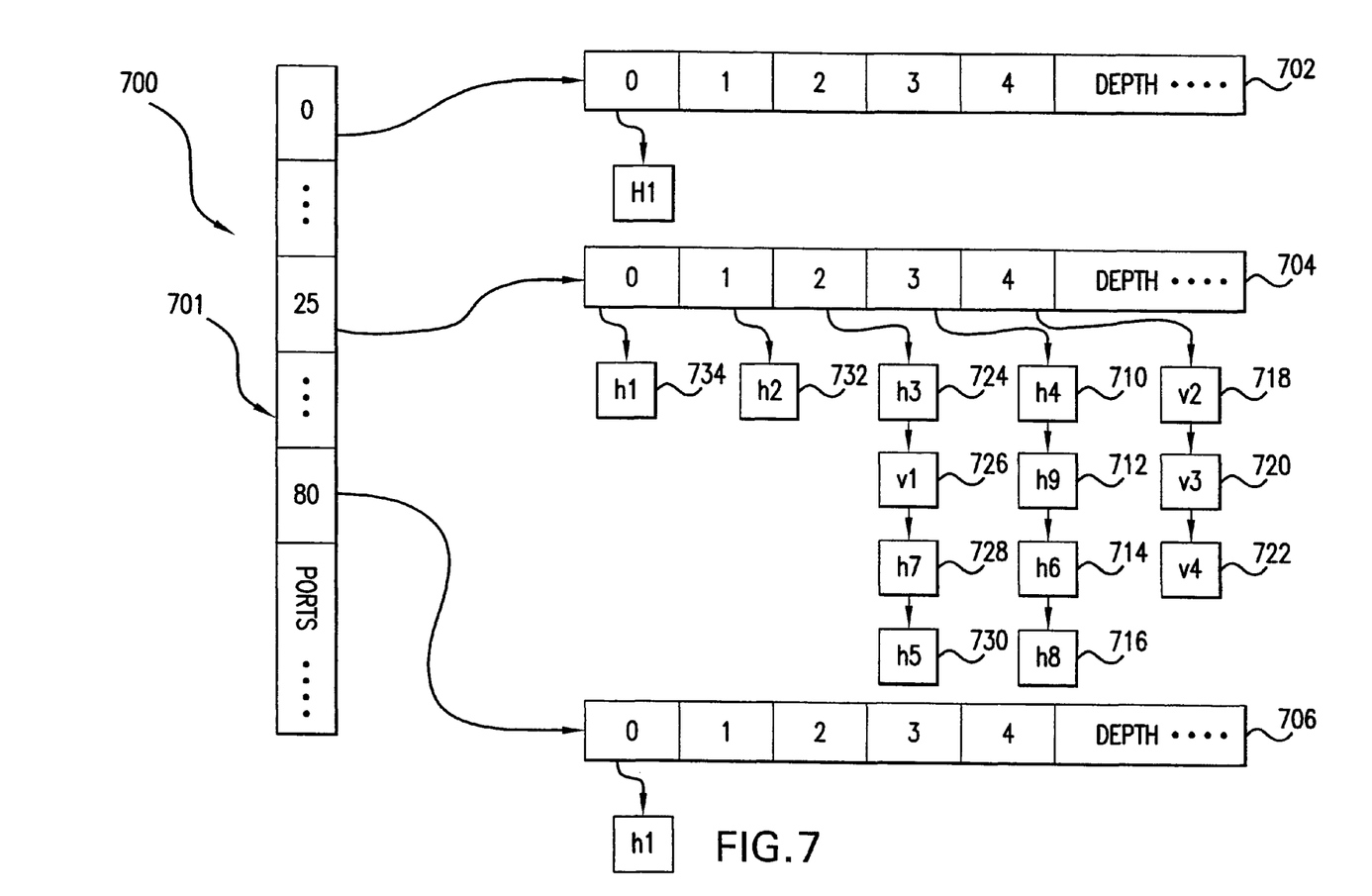
FIG. 7 illustrates one embodiment of a data structure used to organize the traffic behavior occurrences into a tree-like structure.

FIG. 7 illustrates one embodiment of a tree-like data structure called a descendants matrix used to organize the traffic behavior occurrences for one particular traffic behavior. The descendants matrix 700 includes a vector (or linked list or array or hash table) 701 of ports. Each element in vector 701 contains a link to a vector (or linked list or array or hash table) of depths. Vectors 702, 704, and 706 are examples of depth vectors. A vector of depths contains all the hosts which exhibited the traffic behavior that was initiated on a particular port. Each element of a vector of depths contains a linked list (or vector or array or hash table) of host nodes such as 710-734. A vector of depths indicates that a host at one depth exhibited a traffic behavior with a host from the previous depth. For example, every host 718-722 at depth 4 exhibited a traffic behavior with at least one of the hosts 710-716 at depth 3. Hence a host node at a particular depth indicates that the host exhibited the traffic behavior only after a host in each of the previous depths exhibited the traffic behavior. The location of the host nodes in the vector of depths indicates the depth of the tree at which the host exhibited the traffic behavior.

Once all the traffic behavior occurrences that have been detected from the packet traces of the feature window 604 are organized into tree-like data structures such as the descendants matrix, each tree-like data structure is examined to determine if the propagation of traffic behavior occurrences exhibits worm-like propagation. For example, the depth of the tree, the number of nodes in the tree, the average branching factor for each depth of the tree, the average branching factor for the internal nodes of the tree and the average propagation time of the tree can be computed and compared to threshold values to determine if a presence of a worm is likely. If an examination of a tree-like data structure indicates the possible presence of a worm, the hosts in the tree-like data structure are identified as possible worm-infected hosts. The possible worm-infected hosts can be automatically quarantined utilizing strategies described above. In addition, the present invention may notify a natural person such as an administrator of the network, for example, through email, notifications which are displayed on the natural person's computer display, and other alert mechanisms to indicate that a possible presence of a worm has been detected.

Figure 8:
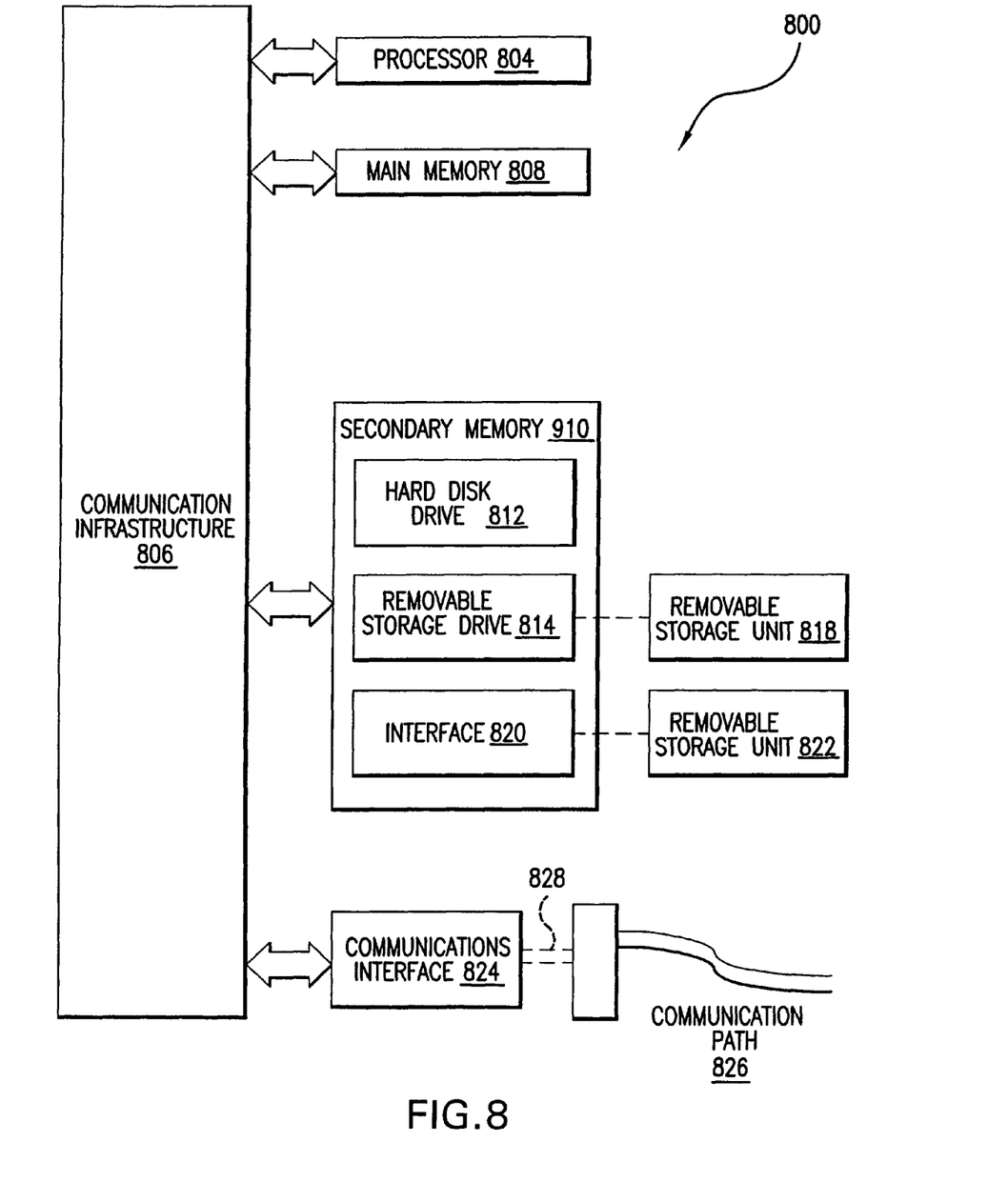
FIG. 8 illustrates an example computer system in which the present invention may be implemented as programmable code.

FIG. 8 illustrates an example computer system 800, in which the present invention may be implemented as programmable code. Various embodiments of the invention are described in terms of this example computer system 800. After reading this description, it will become apparent to a person skilled in the art how to implement the invention using other computer systems and/or computer architectures.

Computer system 800 includes one or more processors, such as processor 804. Processor 804 may be any type of processor, including but not limited to a special purpose or a general purpose digital signal processor. Processor 804 is connected to a communication infrastructure 806 (for example, a bus or network). Various software implementations are described in terms of this exemplary computer system. After reading this description, it will become apparent to a person skilled in the art how to implement the invention using other computer systems and/or computer architectures.

Computer system 800 also includes a main memory 808, preferably random access memory (RAM), and may also include a secondary memory 810. Secondary memory 810 may include, for example, a hard disk drive 812 and/or a removable storage drive 814, representing a floppy disk drive, a magnetic tape drive, an optical disk drive, etc. Removable storage drive 814 reads from and/or writes to a removable storage unit 818 in a well known manner. Removable storage unit 818 represents a floppy disk, magnetic tape, optical disk, etc., which is read by and written to by removable storage drive 814. As will be appreciated, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from removable storage unit 822 to computer system 800.

Computer system 800 may also include a communication interface 824. Communication interface 824 allows software and data to be transferred between computer system 800 and external devices. Examples of communication interface 824 may include a modem, a network interface (such as an Ethernet card), a communication port, a Personal Computer Memory Card International Association (PCMCIA) slot and card, etc. Software and data transferred via communication interface 824 are in the form of signals 828 which may be electronic, electromagnetic, optical, or other signals capable of being received by communication interface 824. These signals 828 are provided to communication interface 824 via a communication path 826. Communication path 826 carries signals 828 and may be implemented using wire or cable, fiber optics, a phone line, a cellular phone link, a radio frequency link, or any other suitable communication channel. For instance, communication path 826 may be implemented using a combination of channels.

In this document, the terms "computer program medium" and "computer usable medium" are used generally to refer to media such as removable storage drive 814, a hard disk installed in hard disk drive 812, and signals 828. These computer program products are means for providing software to computer system 800.

Computer programs (also called computer control logic) are stored in main memory 808 and/or secondary memory 810. Computer programs may also be received via communication interface 824. Such computer programs, when executed, enable computer system 800 to implement the present invention as discussed herein. Accordingly, such computer programs represent controllers of computer system 800. Where the invention is implemented using software, the software may be stored in a computer program product and loaded into computer system 800 using removable storage drive 814, hard disk drive 812, or communication interface 824, to provide some examples.

In alternative embodiments, the invention can be implemented as control logic in hardware, firmware, or software or any combination thereof.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-based method for detecting worms in a computer network, comprising:
(a) monitoring traffic in the computer network to identify one or more traffic behavior occurrences;

(b) organizing the traffic behavior occurrences into a data structure representing a tree having nodes and links, wherein a node represents a host and a link represents one or more traffic behavior occurrences between two nodes, and wherein a new node is added to the tree after a host represented by the new node receives traffic from another host represented by another node already contained in the tree; and (c) using the data structure to determine an average branching factor of each depth of the tree; and (d) indicating that at least one host of the tree is a possible worm-infected host if the average branching factor is greater than a threshold.

2. The method of claim 1, wherein step (a) comprises:
(1) detecting a sequence of packets between a first host and a second host that match a predetermined pattern; and
(2) indicating a traffic behavior occurrence when a matching sequence is detected.

3. The method of claim 2, wherein step (1) comprises:
(i) detecting first packets indicating the establishment of a TCP connection between a first host and a second host;
(ii) detecting a second packet representing a TCP FIN message transmitted from the first host to the second host; and
(iii) detecting an absence of a third packet representing a TCP RST or TCP FIN message transmitted from the second host to the first host, thereby identifying a half-open TCP connection traffic behavior.

4. The method of claim 1, wherein step (a) comprises monitoring traffic between a first host and a second host to identify one or more traffic behavior occurrences, wherein the identified traffic behavior occurrence is a transmission of a packet from the first host to the second host.

5. The method of claim 1, wherein step (c) comprises:
(1) using the data structure to determine the depth of the tree; and
(2) indicating that at least one host of the tree is a possible worm-infected host if the depth is greater than a threshold.

6. The method of claim 1, wherein step (c) comprises:
(1) using the data structure to determine the number of nodes in the tree; and
(2) indicating that at least one host of the tree is a possible worm-infected host if the number of nodes is greater than a threshold.

7. The method of claim 1, further comprising:
(1) using the data structure to determine an average branching factor of the internal nodes of the tree; and
(2) indicating that at least one host of the tree is a possible worm-infected host if the average branching factor is greater than a threshold.

8. The method of claim 1, further comprising:
(1) using the data structure to determine an average propagation time of the tree; and
(2) indicating that at least one host of the tree is a possible worm-infected host if the average propagation time is less than a threshold.

9. The method of claim 1, further comprising:
(1) selecting a subtree of the data structure wherein the subtree is composed of a first node, a second node, a third node, a first link connecting the first node and the second node, and a second link connecting the second node and the third node; and
(2) using the subtree to identify the host represented by the second node as a possible worm-infected host in the computer network.

10. The method of claim 9, wherein step (2) comprises identifying the host represented by the second node as a possible worm-infected host exhibiting an alpha-in alpha-out worm-like symptom if the first link and the second link indicate the same traffic behavior occurrence.

11. The method of claim 9, wherein step (2) comprises identifying the host represented by the second node as a possible worm-infected host exhibiting a server-to-client worm-like symptom if the first link and the second link indicate the same traffic behavior occurrence wherein the traffic behavior occurrence indicates that a packet was sent to a particular port.

12. The method of claim 1, further comprising:
(e) identifying one or more hosts in the data structure that exhibited the same traffic behavior as the possible worm-infected host to indicate that the hosts are possible worm-infected hosts in the computer network.

13. The method of claim 1, further comprising:
(1) selecting a host in the data structure that should be prohibited from exhibiting a traffic behavior;
(2) using the data structure to determine if the host exhibited the traffic behavior; and
(3) indicating that the host is a possible worm-infected host if the host exhibited the traffic behavior.

14. The method of claim 1, wherein step (b) comprises:
(1) placing the traffic behavior occurrences into a sequence;
(2) creating a data structure representing a tree for at least one host in the sequence wherein the root of the tree represents the host;
(3) selecting a traffic behavior occurrence from the start of the sequence;
(4) identifying a source host and a destination host from the traffic behavior occurrence wherein the source host initiated the traffic behavior and the destination host was the target of the traffic behavior;
(5) adding the destination host as a leaf node to the tree if the destination host is not already in the tree and there exists a node in the tree that represents the source host;
(6) removing the traffic behavior occurrence from the start of the sequence; and
(7) repeating steps (3)-(6) for all traffic behavior occurrences in the sequence.

15. The method of claim 1, wherein addition of the new node to the data structure reflects a causal relationship between the host represented by the new node and the another host represented by the another node.

16. The method of claim 15, wherein the causal relationship is time based, as the new node is added to the data structure after occurrence of the event.

17. An apparatus for detecting worms in a computer network, comprising:
a monitoring module to monitor traffic in the computer network to identify one or more traffic behavior occurrences;
an organizing module to organize the traffic behavior occurrences into a data structure representing a tree having nodes and links, wherein a node represents a host and a link represents one or more traffic behavior occurrences between two nodes, and wherein a new node is added to the tree after a host represented by the new node receives traffic from another host represented by another node already contained in the tree; and
a using module to use the data structure to determine an average branching factor of each depth of the tree; and an indicating module to indicate that at least one host of the tree is a possible worm-infected host if the average branching factor is greater than a threshold.

18. The apparatus according to claim 17, wherein the monitoring module comprises:
a first detecting module to detect a sequence of packets between a first host and a second host that match a predetermined pattern; and
a second indicating module to indicate a traffic behavior occurrence when a matching sequence is detected.

19. The apparatus according to claim 18, wherein the first detecting module comprises:
a second detecting module for detecting first packets indicating the establishment of a TCP connection between a first host and a second host;
a third detecting module for detecting a second packet representing a TCP FIN message transmitted from the first host to the second host; and
a fourth detecting module for detecting an absence of a third packet representing a TCP RST or TCP FIN message transmitted from the second host to the first host, thereby identifying a half-open TCP connection traffic behavior.

20. The apparatus according to claim 17, wherein the monitoring module monitors traffic between a first host and a second host to identify one or more traffic behavior occurrences, wherein the identified traffic behavior occurrence is a transmission of a packet from the first host to the second host.

21. The apparatus according to claim 17, wherein the using module:
uses the data structure to determine the depth of the tree and indicates that at least one host of the tree is a possible worm-infected host if the depth is greater than a threshold.

22. The apparatus according to claim 17, wherein the using module:
uses the data structure to determine the number of nodes in the tree and
indicates that at least one host of the tree is a possible worm-infected host if the number of nodes is greater than a threshold.

23. The apparatus according to claim 17, wherein the using module
uses the data structure to determine an average branching factor of each depth of the tree and
indicates that at least one host of the tree is a possible worm-infected host if the average branching factor is greater than a threshold.

24. The apparatus according to claim 17, wherein the using module:
uses the data structure to determine an average branching factor of the internal nodes of the tree; and
indicates that at least one host of the tree is a possible worm-infected host if the average branching factor is greater than a threshold.

25. The apparatus according to claim 17, wherein the using module
uses the data structure to determine an average propagation time of the tree; and
indicates that at least one host of the tree is a possible worm-infected host if the average propagation time is less than a threshold.

26. The apparatus according to claim 17, wherein the using module:
selects a subtree of the data structure wherein the subtree is composed of a first node, a second node, a third node, a first link connecting the first node and the second node, and a second link connecting the second node and the third node and
uses the subtree to identify the host represented by the second node as a possible worm-infected host in the computer network.

27. The apparatus according to claim 26, wherein the host represented by the second node as a possible worm-infected host exhibits an alpha-in alpha-out worm-like symptom if the first link and the second link indicate the same traffic behavior occurrence.

28. The apparatus according to claim 26, wherein the host represented by the second node as a possible worm-infected host exhibits a server-to-client worm-like symptom if the first link and the second link indicate the same traffic behavior occurrence wherein the traffic behavior occurrence indicates that a packet was sent to a particular port.

29. The apparatus according to claim 17, further comprising:
an identifying module to identify one or more hosts in the data structure that exhibited the same traffic behavior as the possible worm-infected host to indicate that the hosts are possible worm-infected hosts in the computer network.

30. The apparatus according to claim 17, wherein the using module is further configured to:
select a host in the data structure that should be prohibited from exhibiting a traffic behavior;
use the data structure to determine if the host exhibited the traffic behavior; and
indicate that the host is a possible worm-infected host if the host exhibited the traffic behavior.

31. The apparatus according to claim 17, wherein the organizing module is further configured to:
place the traffic behavior occurrences into a sequence;
create a data structure representing a tree for at least one host in the sequence wherein the root of the tree represents the host; and
process the following functions for traffic behavior occurrences in the sequence:
selecting a traffic behavior occurrence from the start of the sequence,
identifying a source host and a destination host from the traffic behavior occurrence, wherein the source host initiated the traffic behavior and the destination host was the target of the traffic behavior,
adding the destination host as a leaf node to the tree if the destination host is not already in the tree and there exists a node in the tree that represents the source host, and
removing the traffic behavior occurrence from the start of the sequence.

32. A computer-based method for detecting worms in a computer network, comprising:
(a) monitoring traffic in the computer network to identify one or more traffic behavior occurrences;
(b) generating a graph-based representation of the traffic behavior occurrences comprising a tree having nodes and links, wherein a node represents a host and a link represents one or more traffic behavior occurrences between two nodes, and wherein a new node is added to the tree after a host represented by the new node receives traffic from another host represented by another node already contained in the tree; and
(c) using the graph based representation to determine an average branching factor of each depth of the tree; and (d) indicating that at least one host of the tree is a possible worm-infected host if the average branching factor is greater than a threshold.

33. The method of claim 1, further comprising organizing the traffic behavior occurrences into a descendants matrix for each type of traffic behavior, wherein the descendants matrix includes a vector of ports.

34. The method of claim 33, wherein each vector of ports includes a link to a vector of depths, the vector of depths comprising hosts which exhibited a traffic behavior initiated on a particular port.

35. The method of claim 34, wherein each vector of depths includes a linked list of host nodes indicating that a host at one depth exhibited a traffic behavior with a host from the previous depth.

36. The method of claim 33, further comprising:
examining the descendants matrix to determine if propagation of the traffic behavior occurrences exhibits worm-like propagation behavior.

37. The method of claim 33, further comprising:
(1) determining a depth associated with the descendants matrix; and
(2) indicating that at least one host of the descendants matrix is a possible worm-infected host if the depth is greater than a threshold.

38. The method of claim 33, further comprising:
(1) determining a number of nodes associated with the descendants matrix; and
(2) indicating that at least one host in the descendants matrix is a possible worm-infected host if the number of nodes is greater than a threshold.

39. The method of claim 33, further comprising:
(1) determining an average branching factor of each depth of the tree using the descendants matrix; and
(2) indicating that at least one host in the descendants matrix is a possible worm-infected host if the average branching factor is greater than a threshold.

40. The method of claim 33, further comprising:
(1) determining an average branching factor of internal nodes of the tree using the descendants matrix; and
(2) indicating that at least one host in the descendants matrix is a possible worm-infected host if the average branching factor is greater than a threshold.

41. The method of claim 33, further comprising:
(1) determining an average propagation time of the tree using the descendants matrix; and
(2) indicating that at least one host in the descendants matrix is a possible worm-infected host if the average propagation time is less than a threshold.

42. A computer program product including a non-transitory computer-readable medium having instructions stored thereon that, when executed by a computing device, cause the computing device to perform operations comprising:
(a) monitoring traffic in the computer network to identify one or more traffic behavior occurrences;
(b) organizing the traffic behavior occurrences into a data structure representing a tree having nodes and links, wherein a node represents a host and a link represents one or more traffic behavior occurrences between two nodes, and wherein a new node is added to the tree after a host represented by the new node receives traffic from another host represented by another node already contained in the tree;
(c) using the data structure to determine an average branching factor of each depth of the tree; and
(d) indicating that at least one host of the tree is a possible worm-infected host if the average branching factor is greater than a threshold.

43. The computer program product of claim 42, wherein step (a) comprises:
(1) detecting a sequence of packets between a first host and a second host that match a predetermined pattern; and
(2) indicating a traffic behavior occurrence when a matching sequence is detected.

44. The computer program product of claim 43, wherein step
(1) comprises:
(i) detecting first packets indicating the establishment of a TCP connection between a first host and a second host;
(ii) detecting a second packet representing a TCP FIN message transmitted from the first host to the second host; and
(iii) detecting an absence of a third packet representing a TCP RST or TCP FIN message transmitted from the second host to the first host, thereby identifying a half-open TCP connection traffic behavior.

45. The computer program product of claim 42, wherein step (a) comprises monitoring traffic between a first host and a second host to identify one or more traffic behavior occurrences, wherein the identified traffic behavior occurrence is a transmission of a packet from the first host to the second host.

46. The computer program product of claim 42, wherein step (c) comprises:
(1) using the data structure to determine the depth of the tree; and
(2) indicating that at least one host of the tree is a possible worm-infected host if the depth is greater than a threshold.

47. The computer program product of claim 42, wherein step (c) comprises:
(1) using the data structure to determine the number of nodes in the tree; and
(2) indicating that at least one host of the tree is a possible worm-infected host if the number of nodes is greater than a threshold.

48. The computer program product of claim 42, further comprising:
(1) using the data structure to determine an average branching factor of the internal nodes of the tree; and
(2) indicating that at least one host of the tree is a possible worm-infected host if the average branching factor is greater than a threshold.

49. The computer program product of claim 42, further comprising:
(1) using the data structure to determine an average propagation time of the tree; and
(2) indicating that at least one host of the tree is a possible worm-infected host if the average propagation time is less than a threshold.

50. The computer program product of claim 42, further comprising:
(1) selecting a subtree of the data structure wherein the subtree is composed of a first node, a second node, a third node, a first link connecting the first node and the second node, and a second link connecting the second node and the third node; and
(2) using the subtree to identify the host represented by the second node as a possible worm-infected host in the computer network.

51. The computer program product of claim 50, wherein step (2) comprises identifying the host represented by the second node as a possible worm-infected host exhibiting an alpha-in alpha-out worm-like symptom if the first link and the second link indicate the same traffic behavior occurrence.

52. The computer program product of claim 50, wherein step (2) comprises identifying the host represented by the second node as a possible worm-infected host exhibiting a server-to-client worm-like symptom if the first link and the second link indicate the same traffic behavior occurrence wherein the traffic behavior occurrence indicates that a packet was sent to a particular port.

53. The computer program product of claim 42, the operations further comprising:
(e) identifying one or more hosts in the data structure that exhibited the same traffic behavior as the possible worm-infected host to indicate that the hosts are possible worm-infected hosts in the computer network.

54. The computer program product of claim 42, the operations further comprising:
(1) selecting a host in the data structure that should be prohibited from exhibiting a traffic behavior;
(2) using the data structure to determine if the host exhibited the traffic behavior; and
(3) indicating that the host is a possible worm-infected host if the host exhibited the traffic behavior.

55. The computer program product of claim 42, wherein step (b) comprises:
(1) placing the traffic behavior occurrences into a sequence;
(2) creating a data structure representing a tree for at least one host in the sequence wherein the root of the tree represents the host;
(3) selecting a traffic behavior occurrence from the start of the sequence;
(4) identifying a source host and a destination host from the traffic behavior occurrence wherein the source host initiated the traffic behavior and the destination host was the target of the traffic behavior;
(5) adding the destination host as a leaf node to the tree if the destination host is not already in the tree and there exists a node in the tree that represents the source host;
(6) removing the traffic behavior occurrence from the start of the sequence; and
(7) repeating steps (3)-(6) for all traffic behavior occurrences in the sequence.

* * * * *